United States Patent
Boura et al.

(10) Patent No.: US 8,619,262 B2
(45) Date of Patent: Dec. 31, 2013

(54) DEVICE AND METHOD FOR VIBRATING A SOLID AMPLIFICATION MEMBER WITHIN A GYROLASER

(75) Inventors: Andre Boura, Chatellerault (FR); François Gutty, Palaiseau (FR); Francois Perez, Migne-Auxances (FR)

(73) Assignee: Thales, Neuilly sur Seine (FR)

( * ) Notice: Subject to any disclaimer, the term of this patent is extended or adjusted under 35 U.S.C. 154(b) by 173 days.

(21) Appl. No.: 13/126,454

(22) PCT Filed: Oct. 26, 2009

(86) PCT No.: PCT/EP2009/064045
§ 371 (c)(1),
(2), (4) Date: May 13, 2011

(87) PCT Pub. No.: WO2010/049374
PCT Pub. Date: May 6, 2010

(65) Prior Publication Data
US 2011/0205546 A1    Aug. 25, 2011

(30) Foreign Application Priority Data
Oct. 28, 2008 (FR) .................................... 08 05985

(51) Int. Cl.
*G01C 19/72* (2006.01)
*G01C 19/5719* (2012.01)

(52) U.S. Cl.
USPC ........................................ 356/461; 73/504.04

(58) Field of Classification Search
USPC ......... 356/459, 460, 471, 472, 473, 474, 475; 73/504.01, 504.02, 504.03, 504.04
See application file for complete search history.

(56) References Cited

U.S. PATENT DOCUMENTS

| 3,503,688 | A * | 3/1970 | Lechevalier ................. 356/471 |
| 4,710,027 | A * | 12/1987 | Fersht et al. ................. 356/472 |
| 5,367,528 | A | 11/1994 | Diels et al. |
| 6,462,825 | B1 | 10/2002 | Wiebesick |
| 7,446,879 | B2 * | 11/2008 | Feugnet et al. ............... 356/459 |
| 7,589,841 | B2 | 9/2009 | Schwartz et al. |
| 2008/0043225 | A1 * | 2/2008 | Schwartz et al. .............. 356/73 |
| 2010/0080254 | A1 * | 4/2010 | Lundquist et al. ............. 372/35 |
| 2011/0235047 | A1 * | 9/2011 | Gutty et al. ................... 356/469 |

FOREIGN PATENT DOCUMENTS

| EP | 1 890 107 A1 | 2/2008 |
| FR | 2 905 005 A1 | 2/2008 |
| GB | 2 010 576 A | 6/1979 |

OTHER PUBLICATIONS

Klaus Schneider."1.1-W single-frequency 532-nm radiation by second-harmonic generation of a miniature Nd:YAG ring laser". Dec. 15, 1996, Optical Society of America vol. 21 p. 1-3.*

Klaus Schneider. "Bright squeezed-light generation by a continuous-wave semimonolithic parametric amplifier". Apr. 22, 1996, Optical Societ of America vol. 21 p. 1.*

* cited by examiner

*Primary Examiner* — Gregory J Toatley
*Assistant Examiner* — Maurice Smith
(74) *Attorney, Agent, or Firm* — Baker & Hostetler LLP

(57) ABSTRACT

A laser gyro includes an amplifying solid element and a device for vibrating said amplifying solid element at a predetermined frequency, along an axis of revolution of said amplifying solid element. The geometry of said amplifying solid element is such that a natural mode of mechanical vibration of said amplifying solid element corresponds to said predetermined frequency.

11 Claims, 3 Drawing Sheets

DEVICE AND METHOD FOR VIBRATING A SOLID AMPLIFICATION MEMBER WITHIN A GYROLASER

CROSS-REFERENCE TO RELATED APPLICATIONS

This application is a National Stage of International patent application PCT/EP2009/064045, filed on Oct. 26, 2009, which claims priority to foreign French patent application No. FR 0805985, filed on Oct. 28, 2008, the disclosures of which are incorporated by reference in their entirety.

FIELD OF THE INVENTION

The invention pertains to a device and a method for vibrating an amplifying solid element within a laser gyro.

BACKGROUND

A gyrometer is a motion sensor which makes it possible to measure the rotation rate of the reference frame of the sensor with respect to a Galilean reference frame, about one or more axes.

A laser gyrometer is a bidirectional ring laser which makes it possible to measure an angular rate or a relative angular position by temporal integration. It consists of an optical cavity composed of several mirrors assembled on a block in which paths are drilled to provide an optical cavity. An amplifying medium is inserted into the optical path of the cavity and an excitation system provides it with energy making it possible to generate the laser gain. The elements from which the laser cavity is composed are chosen so as to allow bidirectional operation: the laser cavity must be able to simultaneously sustain two waves which propagate in opposite directions (so-called counter-rotating waves).

The majority of laser gyrometers, also called laser gyros, use a gaseous amplifying medium which is customarily a mixture of helium and neon. However, it is possible to use a laser gyro with solid-state amplifying medium, in which the gaseous amplifying medium is replaced with a solid element, for example a Neodymium-doped YAG (Yttrium-Aluminum-Garnet) matrix.

The operating principle of a laser gyro is based on the Sagnac effect in a ring laser cavity to which a rotational motion is imparted. When the cavity is stationary, the two counter-rotating waves exhibit the same optical frequency. In the presence of a rotational motion in the plane of the optical cavity, the Sagnac effect induces a difference of frequency $\Omega$ between the two counter-rotating optical waves. A fraction of the energy of each wave is extracted from the cavity. A recombination device causes the two extracted beams to interfere so as to form interference fringes which are observed with the aid of one or more photo-detectors. In an ideal laser gyrometer, the frequency of the fringes in front of the photo-detector is proportional to the rotation rate impressed on the cavity and their direction of travel depends on the direction of rotation. In the solid media customarily used, including Nd:YAG, the two counter-rotating waves share the same amplifying atoms. One then speaks of homogeneous gain. Along the cavity, the two counter-rotating waves form a standing wave with intensity antinodes and nodes. When the cavity is at rest or rotating at very low rate, the interference grating remains stationary with respect to the cavity; when the cavity is subjected to a sufficient rate of rotation, the frequencies of the counter-rotating modes move further apart and the grating moves with respect to the elements of the cavity. The atoms of the gain medium participate all the more in the process of stimulated emission the closer they are to an antinode of the standing wave and all the less the closer they are to a node. A population inversion grating, registered by the intensity grating of the standing wave, is then created in the gain medium. This population inversion grating persists as long as the frequencies of the two counter-rotating modes are sufficiently close (i.e. the intensity grating in the cavity moves slowly). Its contrast is all the weaker that the intensity grating moves rapidly with respect to the reaction time of the gain, that is to say that the frequency difference between counter-rotating waves is large compared with the inverse of the life time of the excited level.

French patent application FR 2905005 (THALES), describes a laser gyro comprising at least one ring optical cavity and a solid-state amplifying medium that are arranged in such a way that two so-called counter-rotating optical modes can coexist inside said optical cavity and can pass through the amplifying medium. The amplifying medium is coupled to an electromechanical device affording the amplifying medium a periodic translational motion along an axis substantially parallel to the direction of propagation of said optical modes.

Such a device makes it possible to modulate the longitudinal position of the active crystal about a mean position, so that the atoms of the crystal are in motion with respect to the nodes and to the antinodes of the interference pattern formed by the two counter-rotating modes, whatever the frequency difference between these two modes. Such a device makes it possible to decrease the contrast of the gain grating, and therefore its injurious effects on the gyrometry measurements while not modifying the length of the cavity. It also makes it possible to attenuate the effects of the backscattering induced by the amplifying medium. Finally, the device according to the invention potentially constitutes a device for dealing with the blind zone that can, as required, be substituted for or be complementary to the customary mechanical activation device.

Such a device does not make it possible to use a high activation frequency, necessary for use in the civil aviation sector or in a weapons system. Furthermore, the presence of the activation frequency of the amplifying medium in the useful band of the measurement frequencies causes disturbances to the optical intensities which may prevent proper observation of the output signals.

SUMMARY OF THE INVENTION

An aim of the invention is to alleviate the various problems cited above.

There is proposed, according to one aspect of the invention, a laser gyro comprising an amplifying solid element, and a device for vibrating said amplifying solid element at a predetermined frequency f, along an axis of revolution of said amplifying solid element. Furthermore, the geometry of said amplifying solid element is such that a natural mode of mechanical vibration of said amplifying solid element corresponds to said predetermined frequency f.

Considering the weak internal mechanical damping of the crystals that are liable to constitute the amplifying solid element, the use of a natural mode makes it possible to obtain a motion of maximum amplitude for a given excitation, and excellent frequency stability of said motion.

In a conventional manner, in mechanics, a mode of vibrational deformation of a body in which the forces and moments of inertia are at each instant equal and opposite to the elastic restoring forces and moments is called a natural mode of this body. A natural mode is characterized notably by its displacement profile, that is to say by the amplitude and the direction of the deformation of the body at each of its material points, and by its frequency, commonly called the natural frequency of the mode. One speaks of an undamped natural mode of a body when a natural mode of this body is determined while disregarding the phenomena of mechanical energy dissipation that are related to the internal friction that may exist in this body.

As a consequence of the ratio of the forces and moments of inertia to the elastic restoring forces and moments of a natural mode, a body vibrating according to a natural mode (frequency and displacement profile) exchanges only very little mechanical energy with its environment: it can accumulate and conserve mechanical energy. The vibrations of a body according to a natural mode may be considered to be the result of a permanent internal exchange, at the frequency of the natural mode, between kinetic energy (displacement velocity) and potential energy (elastic deformation).

When the body considered exhibits little internal dissipation, for example because it is monoblock and/or because it is crystalline, a continuous mechanical excitation applied to the body according to the displacement profile of one of its natural modes and at the frequency of this natural mode causes an increasing accumulation of energy. Ever greater amplitudes of vibratory motion are consequently observed, a phenomenon known by the name of resonance. In such a case, the amplitude of the motion ceases to increase when the energy dissipated internally equals the energy supplied by mechanical excitation. It is understood that an even greater amplitude of motion is obtained, for a given excitation, when the internal dissipation is weaker.

Advantageously, said frequency f of vibration is the frequency of the first natural mode of axisymmetric vibration of said amplifying solid element along the direction of propagation of the optical waves of the laser gyro.

The overall size of the vibration device is thus limited, since for a given vibration frequency f, this first axisymmetric mode corresponds to a minimum outside diameter, and thus, advantageously, to a minimum mass. Moreover, the cost of obtaining an amplifying solid element such as this by turning on a lathe is minimal.

The phrase "first natural mode of vibration of the amplifying solid element complying with an axial symmetry with respect to said axis of revolution" is understood as meaning the lowest-frequency natural mode for which the amplitude and direction of the displacement of any material point of the amplifying solid element depend only on the distance between this material point and the axis of revolution. FIGS. 1 and 2 represent, in a global view and in section, the displacement profile of the first axisymmetric mode of a cylindrical amplifying solid element.

In one embodiment, the amplifying solid element comprises an arbitrary combination of the following amplifying solid media: crystal of Nd:YAG, Nd:KGW, Nd:YVO$_4$, Yb:GdCOB, and Nd,Cr:GSGG.

These types of crystals are reliable known crystals, produced industrially or in the laboratory, and of acceptable cost.

According to one embodiment, said frequency f can lie between 0 and 1000 kHz, or even more.

In one embodiment, the device for vibrating said amplifying solid element comprises piezo-electric and/or thermal, and/or mechanical, and/or magnetic excitation means.

Such excitation means of vibration are known, reliable and of moderate cost.

Of course, other excitation means appropriate to the present invention may be envisaged.

According to one embodiment, the laser gyro comprises, furthermore, piezo-electric, and/or thermal, and/or magnetic, and/or optical means for controlling said vibration of the amplifying solid element.

The device can thus comprise feedback to control the frequency of the oscillations, and improve their spatial and temporal regularity.

In one embodiment, said device for vibrating said amplifying solid element comprises a mountable/dismountable support.

Thus the cost of producing apparatuses using these devices is limited.

According to one embodiment, the laser gyro comprises means for fixing and vibrational decoupling of the support and of the assembly comprising the vibration device and the amplifying solid element.

Thus, when the device is fixed to a support, the support does not experience the oscillation frequency imposed on the device.

In one embodiment, said fixing and vibrational decoupling means comprise dynamic counterweights, and/or flexible glue with a Young's modulus of the order of one MPa.

The presence of dynamic counterweights, and/or of the flexible glue makes it possible to vibrationally decouple the mountable/dismountable support and the amplifying solid element, that is to say to greatly limit the vibrations transmitted by the mountable/dismountable support to the system on which the gyrometer is mounted.

According to another aspect of the invention, there is proposed a system for measuring from one to three angular rates or for measuring from one to three relative angular offsets in relation to respective axes, comprising one to three laser gyros such as described above, respectively oriented along said respective axes, and mounted on a common mechanical structure.

Such a measurement system simplifies the implementation of the electronic ancillaries necessary for the operation of the assembly, improves material compactness and decreases the costs of production in relation to the metrological pathway.

According to another aspect of the invention, there is also proposed a method for vibrating an amplifying solid element, in which said amplifying solid element is vibrated at a predetermined frequency f, in the direction of the axis of revolution of said amplifying solid element, and said amplifying solid element is designed so that a natural mode of vibration of said amplifying solid element corresponds to said predetermined frequency f.

In one mode of implementation, said amplifying solid element is excited by piezo-electric effect, and/or thermal effect, and/or magnetic effect.

BRIEF DESCRIPTION OF THE DRAWINGS

The invention will be better understood on studying a few embodiments described by way of wholly non-limiting examples and illustrated by the appended drawings in which.

In the various figures, the elements having identical references are identical.

DETAILED DESCRIPTION

Figure 1:
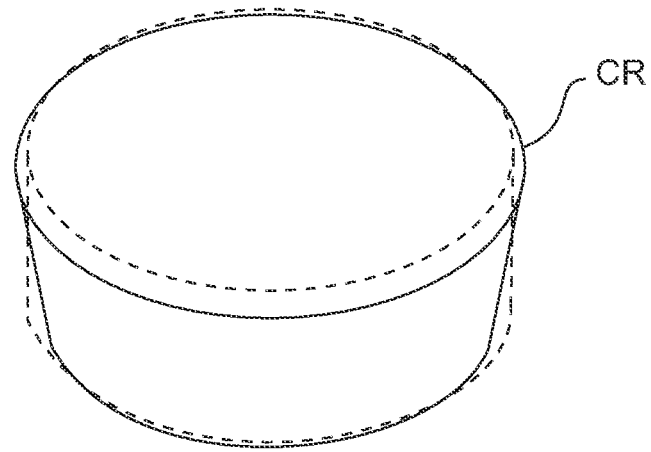
FIGS. 1 and 2 represent, in a global view and in section, the displacement profile of the first axisymmetric mode of a cylindrical amplifying solid element.
Figure 2:
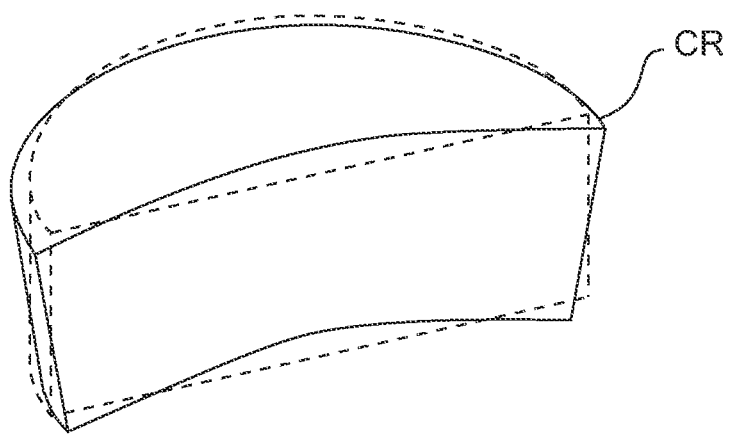
Figure 3:
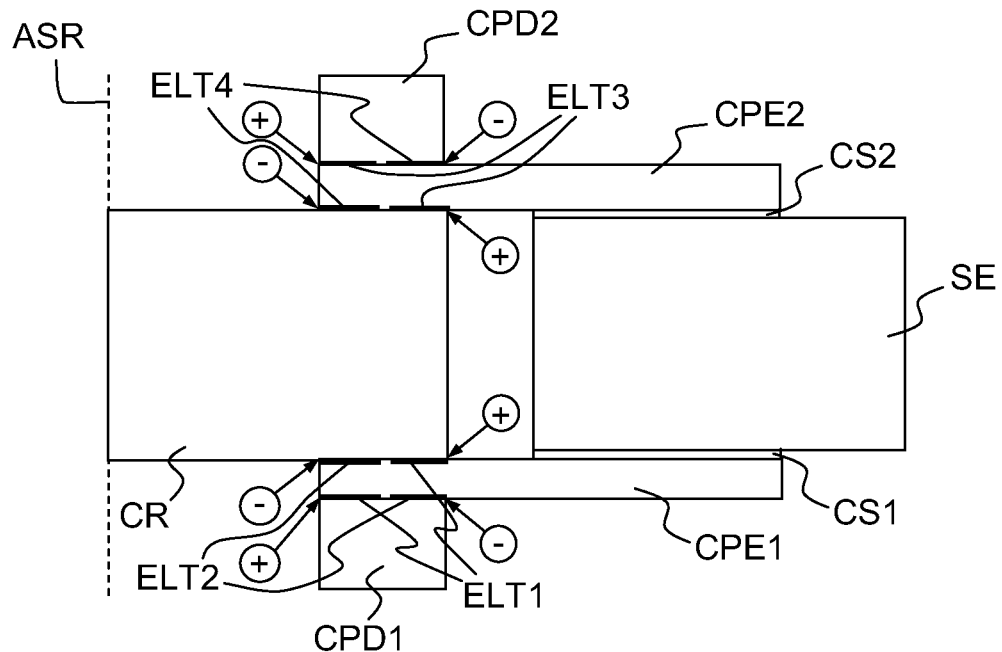
FIG. 3 is a schematic diagram of an embodiment of a device for vibrating an amplifying solid element within a laser gyro, according to one aspect of the invention.
Figure 4:
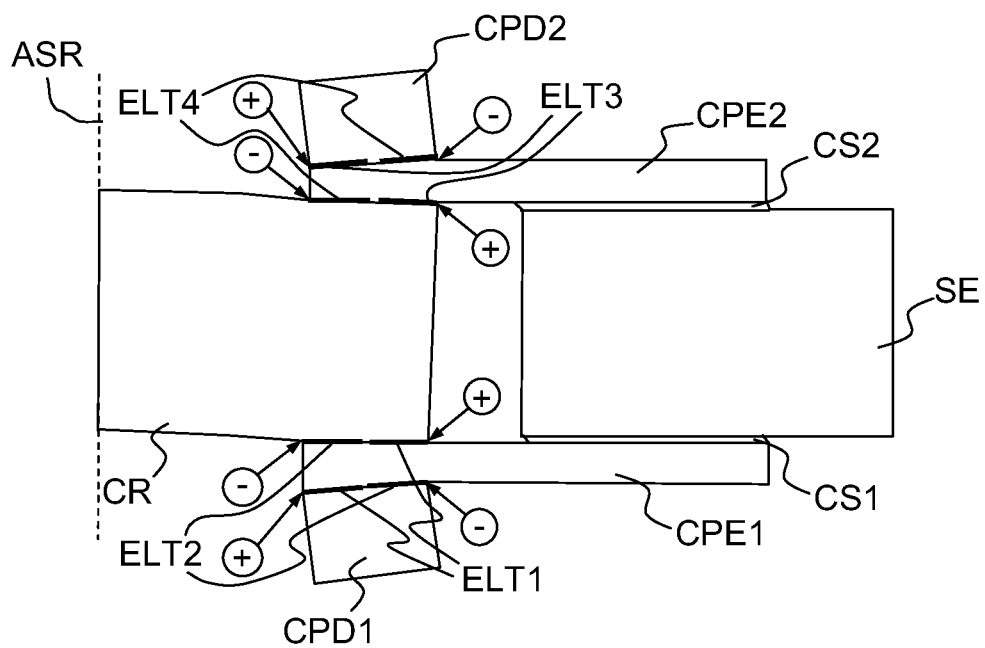
FIG. 4 is a schematic diagram of a device according to FIG. 3, in deformed mode at the vibration frequency, according to one aspect of the invention.

As illustrated in FIG. 3, a laser gyro in half-section, with axis of symmetry of revolution ASR, is represented.

The laser gyro comprises a solid-state amplifying element, or, stated otherwise an amplifying solid element, such as an Nd:YAG crystal referenced CR. As a variant, the solid-state amplifying element may be an arbitrary combination of the amplifying solid media Nd:KGW, Nd:YVO$_4$, Yb:GdCOB, and Nd,Cr:GSGG.

A first piezo-electric ceramic CPE1, controlled by two pairs of electrodes ELT1 and ELT2, makes it possible to vibrate the amplifying solid element CR, at a determined frequency f, along the axis ASR. In a functional manner, the geometry of the amplifying solid element CR, and in particular its dimensioning, is devised such that a natural mode of vibration of the amplifying solid element CR corresponds to the predetermined frequency f.

As a variant, this vibrating at a frequency of possibly as much as around 1000 kHz may be performed by thermal, mechanical or magnetic excitation, or any combination of these excitations.

A second, optional, piezo-electric ceramic CPE2 tied in translation along the axis ASR, with two pairs of electrodes ELT3 and ELT4. This second piezo-electric ceramic may be controlled, via these electrodes ELT3 and ELT4, in parallel with the first, the effect of this being to increase the excitation forces implemented in the device. It is also possible to direct the electrical voltages appearing on these electrodes ELT3 and ELT4, representative of the contraction or expansion of the thickness of the second piezo-electric ceramic CPE2, toward an external control unit (not represented in the figures) so as to create a feedback loop intended to improve the control of the vibration at the frequency f.

The laser gyro comprises a mountable/dismountable support SMD making it possible to facilitate the mounting or dismounting of the laser gyro, and thus to decrease the costs of repair, upgrade, and design of product, for which the laser gyro is intended.

A first layer of flexible glue CS1, with a Young's modulus of the order of one MPa, is disposed between the mountable/dismountable support SMD and the first piezo-electric ceramic CPE1, and a second layer of flexible glue CS2 is disposed between the mountable/dismountable support SMD and the second piezo-electric ceramic CPE2.

For example, the layers of flexible glue CS1 and CS2 have a thickness of the order of 100 μm, and a Young's modulus of the order of 10 MPa.

In an optional manner, the vibration generating device for laser gyro comprises a first dynamic counter-weight or counter-balance CPD1 mounted fixedly by rigid gluing of a thickness of the order of about ten μm, with a Young's modulus of the order of a few GPa, on the first piezo-electric ceramic CPE1, as well as a second dynamic counter-weight or counter-balance CPD2 mounted fixedly by similar rigid gluing on the second piezo-electric ceramic CPE2.

The two layers of flexible glue CS1 and CS2, as well as the first and second dynamic counter-weights CPD1 and CPD2 make it possible to vibrationally decouple the mountable/dismountable support SMD and the amplifying solid element CR, thereby making it possible to greatly limit the vibrations transmitted by the mountable/dismountable support SMD to the system on which the gyrometer is mounted.

Such a laser gyro, makes it possible to obtain, for example for a YAG crystal about 3 mm in thickness and about 8 mm in diameter, oscillations of the crystal of about 0.3 μm peak to peak on the axis of revolution or optical axis, at a frequency substantially equal to 400 kHz.

The present invention, makes it possible to obtain a laser gyro comprising an amplifying solid element to which a vibratory translational motion is imparted in the direction of the optical beam, at a frequency of several tens of kHz, possibly reaching as much as 400 kHz, and several times this value if need be.

Figure 5:
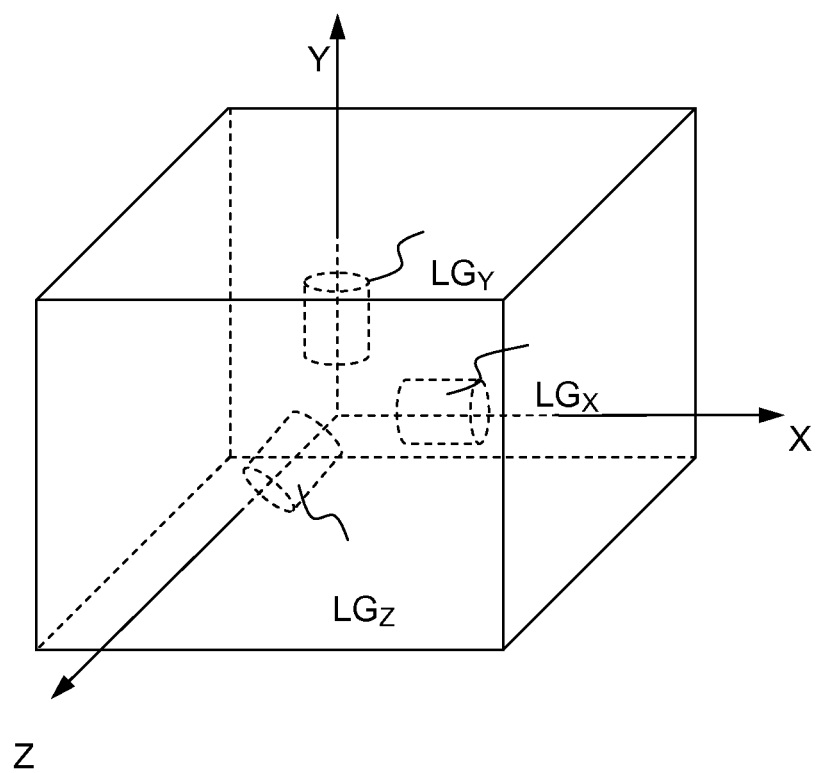
FIG. 5 illustrates a system for measuring from one to three angular rates or for measuring from one to three relative angular offsets in relation to respective axes, including one to three laser gyros, respectively oriented along said respective axes, and mounted on a common mechanical structure.

FIG. 5 illustrates a system for measuring from one to three angular rates or for measuring from one to three relative angular offsets in relation to respective axes, including one to three laser gyros LG$_X$, LG$_Y$, LG$_Z$, respectively oriented along said respective axes X, Y, and Z, and mounted on a common mechanical structure.

The invention claimed is:

1. A laser gyro, comprising:
    an amplifying solid element, and
    a device for vibrating said amplifying solid element at a predetermined frequency f, along an axis of revolution of said amplifying solid element,
    wherein the geometry of said amplifying solid element is such that a natural mode of mechanical vibration of said amplifying solid element corresponds to said predetermined frequency f and to the direction of the axis of revolution of said amplifying solid element, said frequency f of vibration is the frequency of the first natural mode of axisymmetric vibration of said amplifying solid element along the direction of propagation of the optical waves of the laser gyro.

2. The laser gyro as claimed in claim 1, in which the amplifying solid element comprises an arbitrary combination of the following amplifying solid media: crystal of Nd:YAG, Nd:KGW, Nd:YVO$_4$, Yb:GdCOB, and Nd,Cr:GSGG.

3. The laser gyro as claimed in claim 1, in which said frequency f can lie between 0 and 1000 kHz.

4. The laser gyro as claimed in claim 1, in which said device for vibrating said amplifying solid element comprises piezo-electric excitation means and/or thermal, and/or magnetic excitation means.

5. The laser gyro as claimed in claim 1, further comprising piezo-electric means, and/or thermal, and/or mechanical, and/or magnetic, and/or optical means for slaving said vibration of the amplifying solid element.

6. The laser gyro as claimed in claim 1, in which said device for vibrating said amplifying solid element comprises a mountable/dismountable support.

7. The laser gyro as claimed in claim 6, further comprising means for fixing and vibrational decoupling of said support and of the assembly comprising the vibration device and the amplifying solid element.

8. The laser gyro as claimed in claim 7, in which said fixing and vibrational decoupling means comprise dynamic counterweights, and/or flexible glue with a Young's modulus of the order of one MPa.

9. A system for measuring from one to three angular rates or for measuring from one to three relative angular offsets in relation to respective axes, comprising one to three laser gyros according to claim 1, respectively oriented along said respective axes, and mounted on a common mechanical structure.

10. A method for vibrating an amplifying solid element, comprising:

vibrating said amplifying solid element at a predetermined frequency f, in the direction of the axis of revolution of said amplifying solid element, wherein said amplifying solid element is designed so that a natural mode of vibration of said amplifying solid element corresponds to said predetermined frequency f and to the direction of the axis of revolution of said amplifying solid element, said frequency f of vibration is the frequency of the first natural mode of axisymmetric vibration of said amplifying solid element along the direction of propagation of the optical waves of the laser gyro.

11. The method as claimed in claim 10 in which said amplifying solid element is excited by piezo-electric effect, and/or thermal effect, and/or magnetic effect.

* * * * *